(12) United States Patent
Okitsu et al.

(10) Patent No.: US 6,636,713 B2
(45) Date of Patent: Oct. 21, 2003

(54) IMAGE READING APPARATUS

(75) Inventors: Katsuhiko Okitsu, Saitama (JP); Hiroshi Komuro, Saitama (JP)

(73) Assignee: Canon Denshi Kabushiki Kaisha, Chichibu (JP)

( * ) Notice: Subject to any disclaimer, the term of this patent is extended or adjusted under 35 U.S.C. 154(b) by 0 days.

(21) Appl. No.: 09/970,513

(22) Filed: Oct. 4, 2001

(65) Prior Publication Data

US 2002/0044793 A1 Apr. 18, 2002

(30) Foreign Application Priority Data

Oct. 5, 2000  (JP) .......................... 2000/306682
Dec. 28, 2000 (JP) .......................... 2000/403377

(51) Int. Cl.$^7$ .......................... G03G 15/22; G06K 9/00
(52) U.S. Cl. .......................... 399/140; 348/96; 348/110; 382/319
(58) Field of Search .......................... 358/296, 302; 399/118, 140, 141, 206; 382/318, 319; 348/96, 110

(56) References Cited

U.S. PATENT DOCUMENTS 5,796,490 A  * 8/1998  Shidara et al. .............. 399/140
6,297,874 B1  10/2001  Ikeda et al.
6,301,398 B1  10/2001  Kimball et al.

\* cited by examiner

*Primary Examiner*—Hoang Ngo
(74) *Attorney, Agent, or Firm*—Morgan & Finnegan, LLP

(57) ABSTRACT

This invention has as its object to provide a highly reliable image reading apparatus in which both an image reading unit and photographing unit can obtain optimal images. To achieve this object, the apparatus has a light-emitting element array which illuminates a document to be read by a read sensor, and an illumination lamp which illuminates the document to be recorded by the photographing unit.

11 Claims, 13 Drawing Sheets

SPECTRAL SENSITIVITY CHARACTERISTICS OF CCD AND MICROFILM

IMAGE READING APPARATUS

FIELD OF THE INVENTION

The present invention relates to an image reading apparatus which comprises an image reading unit for reading an image of a document, and a photographing unit for recording an image on a photosensitive member such as a film by exposure.

BACKGROUND OF THE INVENTION

In general, an image reading apparatus (to be referred to as a "document scanner" hereinafter) for reading an image as digital image information using a photoelectric conversion element allows easy search, edit, and the like of read and stored information. However, the stored information is not legally endorsed. For example, the stored information cannot be used as an evidence in court. On the other hand, a microfilm on which an image is recorded by the microfilm photographing apparatus is legally endorsed. However, stored information does not allow easy search, edit, and the like.

In this way, the document scanner and microfilm photographing apparatus have opposite characteristics. Hence, an image reading apparatus which can utilize merits of both the microfilm photographing apparatus and document scanner by combining the photographing function of the microfilm photographing apparatus and the function of the document scanner may be proposed. That is, an image reading apparatus which allows easy search, edit, and the like of stored information, and can store information to be legally endorsed may be proposed.

A microfilm photographing apparatus (also called a rotary microfilm camera) for photographing an image on a document on a roll film by slit exposure while feeding the document at a constant speed is known. Also, an image reading apparatus for reading an image on a document by inputting it to a fixed photoelectric conversion element as a linear image while feeding the document is known. Note that the document includes not only a sheet but also thin media such as a card, label, and the like which bear images such as text, pictures, and the like.

FIG. 2 is a schematic view showing principal part of a conventional image reading apparatus.

Referring to FIG. 2, reference numeral 201 denotes a document serving as an object; 202, transparent guide glass windows provided on a convey path to photograph the conveyed document 201; 203A and 203B, lamps for illuminating the document to project an image onto a light-receiving element that performs photoelectric conversion or a microfilm; 204A and 204B, first mirrors which form an optical path for projecting the image of the illuminated document onto the light-receiving element and microfilm; and 205, a slit for splitting the optical path of the image illuminated with lamps into the light-receiving element side and the microfilm photographing side.

Reference numeral 206 denotes a second mirror for guiding the optical path split by the slit 205 toward the light-receiving element; 207, a third mirror for guiding the optical path split by the slit 205 toward the microfilm side; and 208 and 209, fourth and fifth mirrors for similarly guiding the optical path toward the microfilm.

Reference numeral 210 denotes a lens for projecting the image onto the light-receiving element; 211, a read sensor having a photoelectric conversion light-receiving element; 212, a microfilm lens for projecting the image onto the microfilm; 213, a microfilm; and 214, a light amount varying unit prepared by combining two polarization plates to adjust the amount of light to be projected onto the light-receiving element. In the light amount varying unit, the two polarization plates are arranged to overlap each other, and are pivoted so that their directions of polarization cross, thereby adjusting the transmission light amount.

The overall operation will be explained first. A document 201 is conveyed by a document convey unit (not shown) to the guide glass windows. When the conveyed document has reached an image photographing area inside the guide glass windows 202, it is illuminated by the lamps 203A and 203B. An image on the illuminated document is guided toward the photographing side via the first mirrors 204A and 204B, and its optical path is split into the read sensor side and microfilm photographing side by the slit 205 inserted between the first mirrors 204A and 204B, and the second and third mirrors 206 and 207.

Of the split optical paths, the image guided toward the read sensor side is projected onto and read by the read sensor by the lens 210 via the second mirror 206. The image read by the read sensor is captured as image data into a main body (not shown).

The other optical path split by the slit is guided to the third, fourth, and fifth mirrors 207, 208, and 209, and the microfilm 213 is exposed with the illuminated image via the microfilm lens 212.

Read by the read sensor and photographing on the microfilm are done using identical light source light, as can be seen from the arrangement of the optical path.

However, in the aforementioned prior art, since a document is illuminated using a single light source, wavelength ranges and light amounts respectively suitable for the light-receiving element that performs photoelectric conversion, and a photosensitive material such as a microfilm or the like cannot be selected. FIG. 6 shows an example of the characteristics of the photosensitive material and light-receiving elements depending on the light amount.

As can be seen from FIG. 6, when an exposure value is set to obtain an image having an appropriate density upon microfilm photographing, an appropriate image can be photographed on the microfilm. However, that exposure value results in an excessive light amount on the light-receiving element that performs photoelectric conversion, and the read image suffers fog and blurred text, resulting in poor reproduction of details.

Hence, the light amount varying unit such as a filter or the like described in the prior art is required on the optical path between the slit and light-receiving element so as to obtain an appropriate light amount on the light-receiving element. However, such unit may deteriorate image quality. Furthermore, as can be seen from FIG. 3, the light-receiving element that performs photoelectric conversion, and photosensitive material have different photosensitive characteristics.

As can be seen from the above description, when a single light source is used, it is very troublesome to adjust light source light to the photosensitive characteristics of both the light-receiving element and photosensitive material so as to obtain an optimal image, resulting in an expensive apparatus.

In order to allow density adjustment on the photoelectrically converted image side, the light amount varying unit described in the prior art is required, resulting in a complicated mechanism.

In addition, the density of the photographed image on the microfilm changes depending on the image density of the document upon photographing and the characteristics of a developing machine. In this case, the exposure value must be adjusted.

Likewise, density adjustment of the light-receiving element that performs photoelectric conversion is required in correspondence with an image on a document so as to read an image with higher quality.

Since the "exposure value—density output characteristics" of the light-receiving element and microfilm have no correlation, they must be individually set.

An image reading apparatus normally has a plurality of read resolutions, and changes the document convey speed in correspondence with the read resolution so as to take balance between the image quality and file size of the read image. Upon reading at high resolution, if the read speed per line is to be increased while setting a constant document speed, a high-speed, high-sensitivity photoelectric conversion element, and also a higher-speed image processing circuit are required, resulting in an expensive, complicated arrangement. Hence, the image reading apparatus changes and sets the document convey speed in correspondence with the read processing speed of a read processor while taking balance between the cost and arrangement. In this case, in the photographing apparatus using a photosensitive material such as a microfilm or the like, the amount of illumination light must be changed in correspondence with the convey speed for keeping the density of the photographed image constant, because the density of the image is defined by the amount of illumination light and an exposed time.

However, since the conventional apparatus illuminates a document using a single light source, setups that can satisfy the image qualities of both the photoelectric conversion side and film side cannot be obtained, because the changeable amount of the illumination light amount is limited.

In the conventional microfilm photographing apparatus, the feed speed of the document is always constant, and the photographing reduction factor can be switched within the range from ($\frac{1}{24}$) to ($\frac{1}{57}$). For this reason, the user prepares a plurality of photographing lenses having different reduction factors, and exchanges photographing lenses in accordance with the required reduction factor. The microfilm photographing apparatus changes the feed speed of the film in correspondence with the reduction factor, and takes a photo while the exposure value remains the same.

Also, the microfilm photographing device changes the brightness of illumination of a document since the developing condition of the photographed film, the density of the document, and the like may vary. For this purpose, the conventional microfilm photographing apparatus can adjust the brightness of a lamp that illuminates a document within the range from about 10% to about 50%. For example, the microfilm photographing apparatus adjusts the brightness of the lamp that illuminates a document by phase control of an AC power supply of a lamp such as a bulb, fluorescent lamp, or the like using a thyristor or the like, DC control for changing a voltage applied to a lamp, PWM control for controlling the amount of light of a lamp for turning on/off electric power applied to the lamp, and the like.

However, when the image reading apparatus mainly uses the function of the microfilm photographing apparatus to improve the read resolution, as a constant exposure value on a microfilm is set, the document convey speed can only be changed within the adjustment range of a lamp regulator that adjusts illumination of a document. For this reason, the image read resolution of the document scanner in which the read processing speed per line is fixed cannot be drastically changed.

When the read resolution is improved by mainly using the function of the document scanner so as not to disturb the performance of the document scanner, the following problem is posed.

The read resolution of the document scanner can be freely set by changing the document convey speed. For this reason, the document scanner normally has a read resolution range of about six times or more, i.e., a range from about 100 dots per inch (dpi) to about 600 dpi. Dots per inch indicate the number of dots per inch.

In this case, the convey speed of a film as the document changes about six times in correspondence with the read resolution. In the microfilm photographing apparatus that takes a photo by slit exposure, if the amount of light of a document illumination lamp is constant, the exposure value of a film increases in inverse proportion to the document convey speed, thus disturbing photographing at an appropriate density.

The document convey speed is added as new change condition, and conventional conditions such as the developing conditions, document density, and the like must also be taken into consideration. Hence, in order to maintain a constant density of the photographed image in consideration of all these conditions, the light amount of the document illumination lamp of the microfilm photographing apparatus must be varied within the range of around 12 times (around 100% to 8.4%).

For this reason, a lamp light amount control circuit for controlling the amount of light of illumination of a document must control the amount of light within the range of around 12 times or more. Since the light amount control range of a general circuit is around 10% to 50%, control that largely diverges from the general limit range of the amount of light is required, resulting in a very expensive circuit.

As a method of adjusting the amount of light by a relatively simple circuit arrangement, a plurality of illumination lamps may be prepared for the obverse and reverse sides of a document, and the amount of light may be controlled by controlling the number of ON illumination lamps. However, a plurality of illumination lamps, lamp control circuits, and the like are required, a size reduction of the apparatus cannot be attained, and the cost is high.

Therefore, upon simultaneously reading an image using the microfilm photographing apparatus and document scanner, one of an arrangement which sets a constant image read speed to fix the read resolution, and an arrangement which can change the image read speed, prepares for an expensive document illumination device, and adjusts the amount of light in correspondence with the document convey speed must be selected.

SUMMARY OF THE INVENTION

The present invention has been made to solve the conventional problems and has as its object to provide a highly reliable image reading apparatus in which both an image reading unit and photographing unit can obtain optimal images.

It is another object of the present invention to provide an image reading apparatus which can adjust the amount of light corresponding to the document convey speed by changing the degree of opening of a slit even when the document read speed is changed.

In order to solve the above problems and to achieve the above objects, an image reading apparatus according to the first aspect of the present invention is characterized by the following arrangement.

That is, an image reading apparatus which comprises an image reading unit which reads image information of a document, and a photographing unit which records an image of the document on a photosensitive material by exposure, comprises a first image illumination unit which illuminates the document read by the image reading unit, and a second image illumination unit which illuminates the document recorded by the photographing unit.

Also, an image reading apparatus according to the second aspect of the present invention is characterized by the following arrangement.

That is, an image reading apparatus comprises a document convey unit which conveys a document, an image reading unit which reads an image on the document conveyed by the document convey unit, a resolution selection unit which selects an image read resolution of the image reading unit, a photographing unit which has an exposure adjustment unit which adjusts an exposure value by controlling a degree of opening of a slit, and photographs an image on the document conveyed by the document convey unit, and a control unit which controls operations of the document convey unit and the exposure adjustment unit on the basis of the resolution selected by the resolution selection unit so as to adjust a convey speed of the document and the exposure value.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not an exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will be explained in detail hereinafter with reference to the accompanying drawings. Note that the dimensions, materials, and shapes of building components, their relative layout, and the like described in the embodiments should be changed as needed depending on the arrangement of an apparatus to which the present invention is applied, and various conditions, and do not limit the scope of the present invention to themselves unless otherwise specified.

(First Embodiment)

Figure 1:
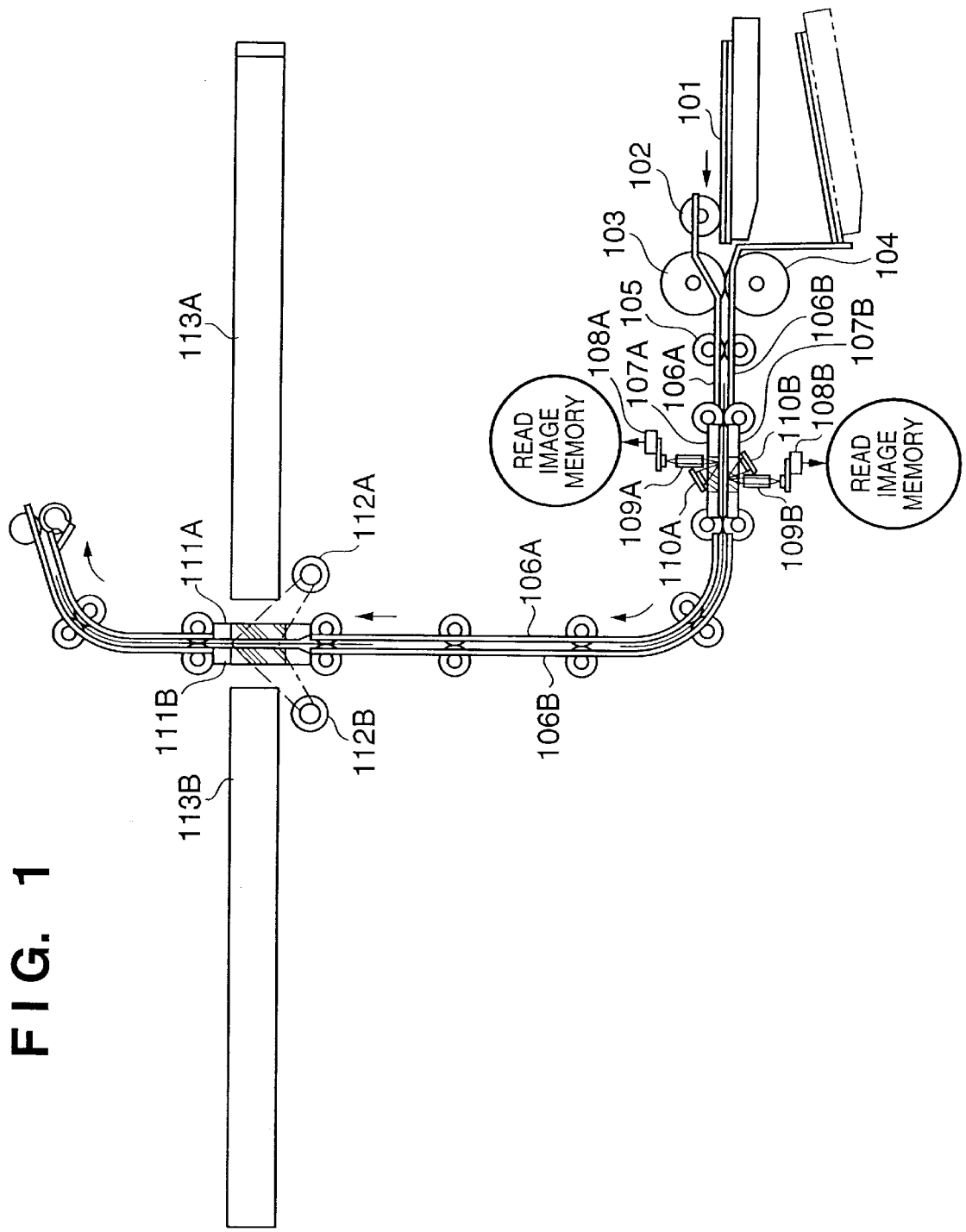
FIG. 1 is a schematic view for explaining an image reading apparatus according to the first embodiment of the present invention.
Figure 2:
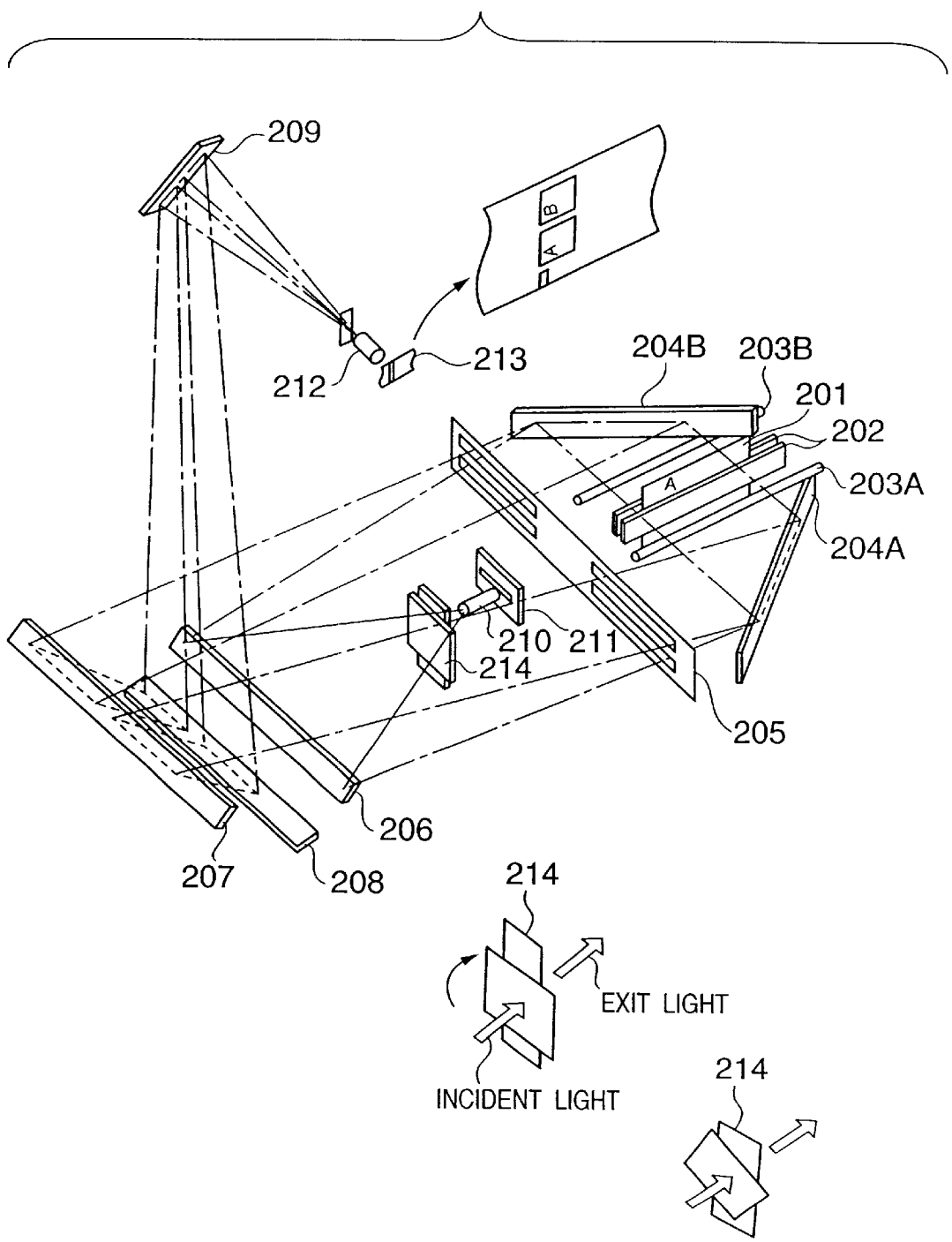
FIG. 2 is a schematic view for explaining an example of the prior art.

FIG. 1 is a schematic view of an image reading apparatus according to the first embodiment of the present invention.

Reference numeral 101 denotes a document serving as an object; 102, 103, and 104, a pickup roller, feed roller, and separation roller for separating and feeding a stack of documents one by one; 105, convey rollers for conveying the fed document; 106A and 106B, convey guide plates for guiding the document to be conveyed; 107A and 107B, transparent guide glass windows provided on the convey path to read the conveyed document 101 by light-receiving elements; and 108A and 108B, read sensors as image reading units each having a linear array of light-receiving elements for performing photoelectric conversion. The sub-scan direction of the light-receiving element array agrees with the document convey direction. Also, by changing the document convey speed, the image read resolution of the light-receiving elements can be set.

Reference numerals 109A and 109B denote lens arrays which line up in the same direction as the read sensors 108A and 108B and are used to form an image of the conveyed document on the read sensors 108A and 108B; and 110A and 110B, light-emitting element arrays which line up in the same direction as the read sensors 108A and 108B, and serve as a first image illumination unit for illuminating the document.

Figure 7:
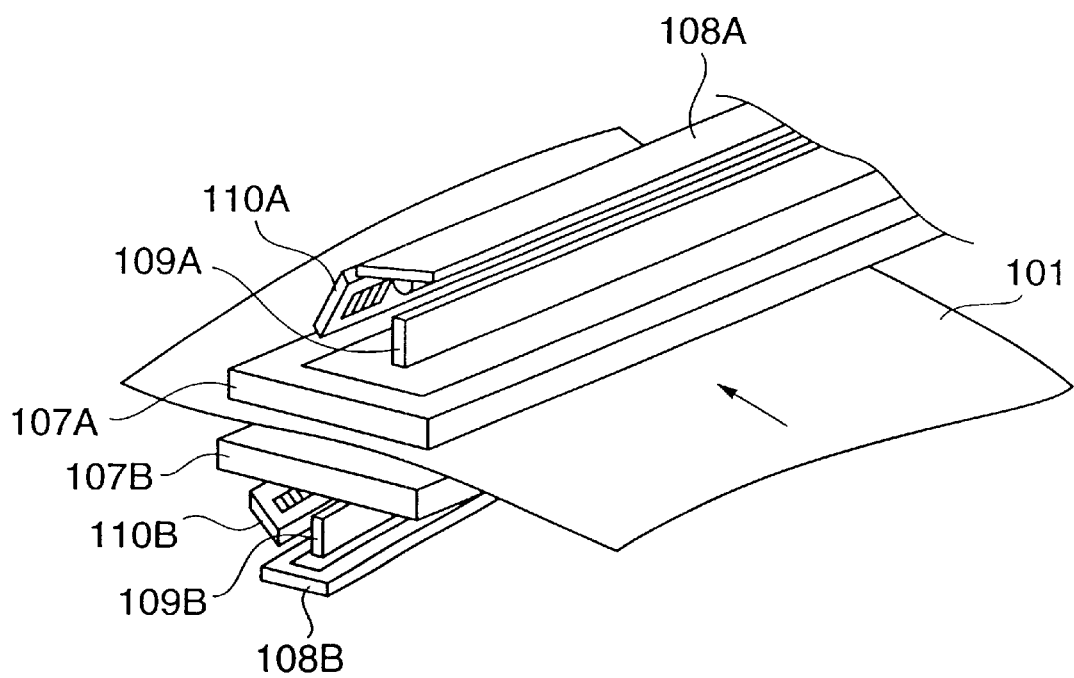
FIG. 7 is a perspective view showing the layout of a document, image read sensor, lens array, and light-emitting element array.

The light-emitting element arrays 110A and 110B can be set as light sources according to the light-receiving sensitivity characteristics of the read sensors 108A and 108B, and have light source light (light source light amount, light source wavelength range) adjusted in correspondence with the light-receiving elements of the read sensors 108A and 108B. FIG. 7 shows the layout of the document, image read sensors 108A and 108B, lens arrays 109A and 109B, and light-emitting element arrays 110A and 110B.

Figure 5:
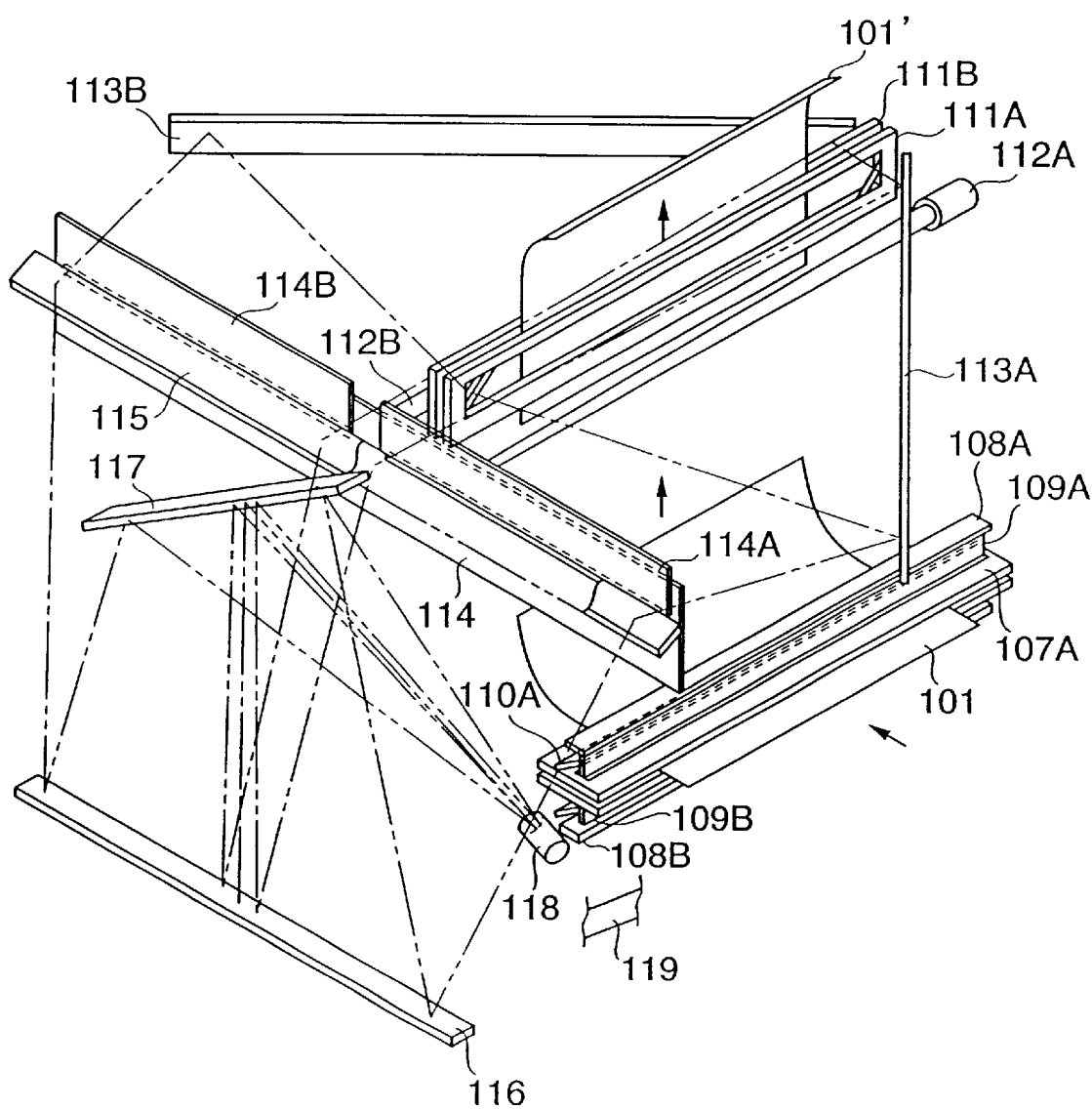
FIG. 5 is a schematic perspective view for explaining principal part of the image reading apparatus according to the first embodiment.
Figure 6:
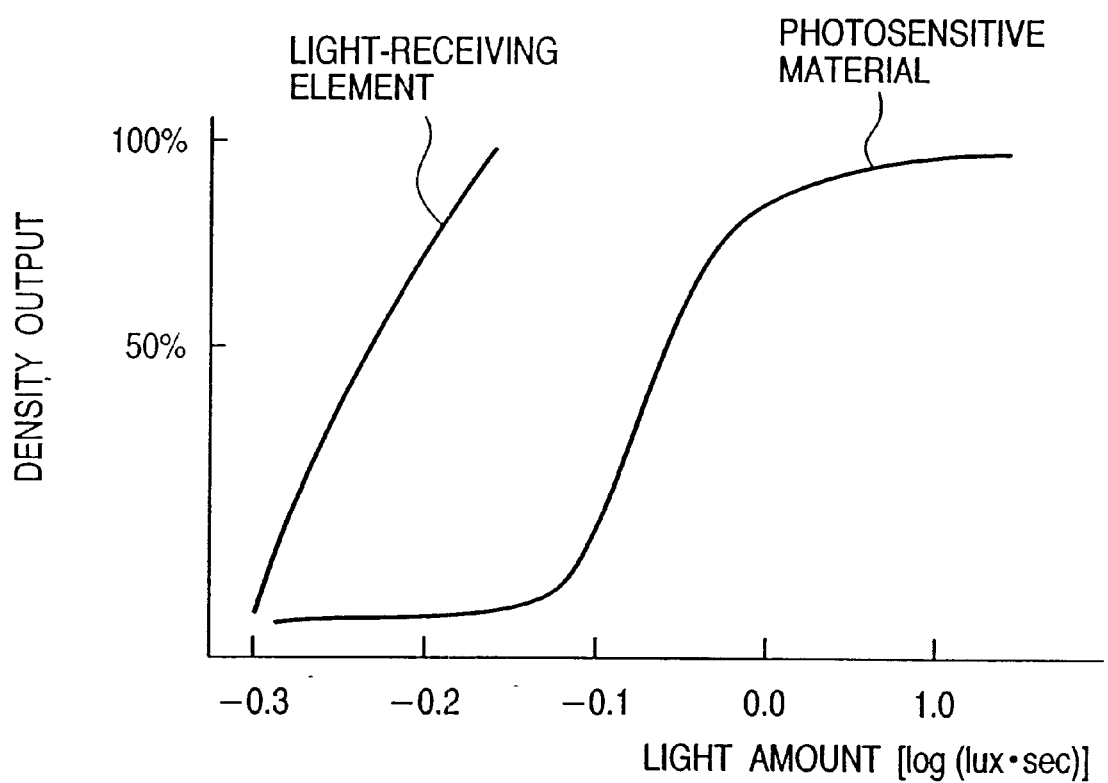
FIG. 6 is a graph showing the light amount sensitivity characteristics of a light-receiving element that performs photoelectric conversion, and a photosensitive material.

FIG. 5 is a schematic perspective view showing principal part of the image reading apparatus. A photographing unit will be explained below using FIGS. 1 and 5.

Reference numerals 111A and 111B denote transparent MF guide glass windows which are provided on the convey path to take a photo of the conveyed document 101; and 112A and 112B, cold cathode tube type illumination lamps serving as a second image illumination unit which illuminates the document to project an image onto a microfilm.

The illumination lamps 112A and 112B can be set as light sources according to the light-receiving sensitivity characteristics of the microfilm, and have light source light (light source light amount, light source wavelength range) adjusted to the microfilm. For example, a halogen lamp or a cold cathode lamp of white or single color is used.

Figure 4:
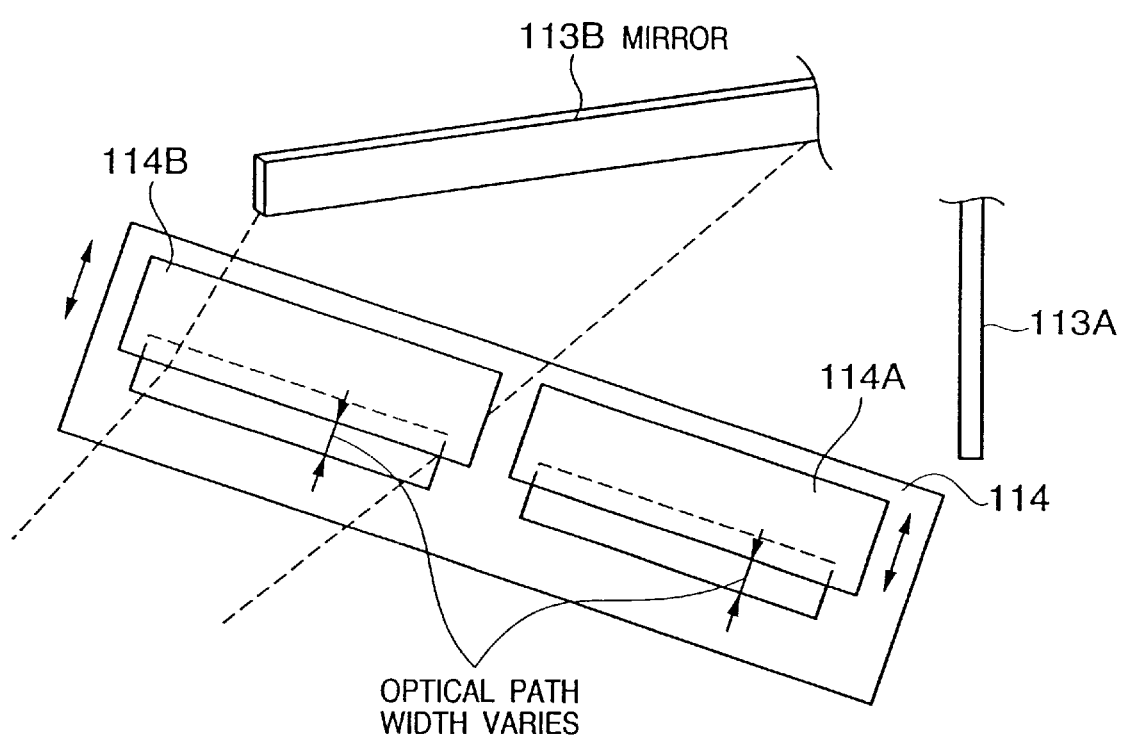
FIG. 4 is a schematic perspective view showing a varying operation of a slit.

Reference numerals 113A and 113B denote first mirrors which form an optical path for projecting an image of the illuminated document onto the microfilm; and 114, a variable slit which can adjust the amount of light that exposes the microfilm. This light amount varying mechanism can change the optical path width of the optical path projected onto the microfilm, as shown in FIG. 4.

Reference numerals 115, 116, and 117 denote second, third, and fourth mirrors for guiding the optical path adjusted by the slit 114 toward the microfilm side; and 118, a microfilm lens for forming an optical path that projects an image onto the microfilm. Reference numeral 119 denotes a microfilm as one of photosensitive materials. Note that the second mirror 115 in FIG. 5 is illustrated in a partially cutaway state in its longitudinal direction, so that the state of the slit 114 is easy to see.

The operation of the apparatus will be briefly explained below. The document 101 serving as an object is separated and fed one by one from a stack of a plurality of documents by the pickup roller 102, feed roller 103, and separation roller 104. The fed document 101 is fed into the guide glass windows 107A and 107B and is conveyed to the read position of the read sensors 108A and 108B by the convey rollers.

The document 101 that has reached a desired position is illuminated by the light-emitting element arrays 110A and 110B, and its image is read by the read sensors 108A and 108B via the lens arrays 109A and 109B. After sensitivity adjustment of the light-receiving elements and photoelectric conversion of received image data in accordance with external commands, segmentation to predetermined levels is done. In this way, density adjustment and contrast setting upon reading an image can be done, thus obtaining a desired image.

Since the read sensors 108A and 108B, lens arrays 109A and 109B, and LED (light-emitting element) arrays 111A and 110B are arranged on the upper and lower sides of the document convey path in FIG. 1, the obverse and reverse sides of the document can be read.

Since the light-emitting element arrays are constructed to be able to selectively emit lights of plural wave lengths for dealing a color document, it is able to skip the reading of an arbitrary color or to emphasize an arbitrary color. Further, it is able to read the document with color.

Figure 3:
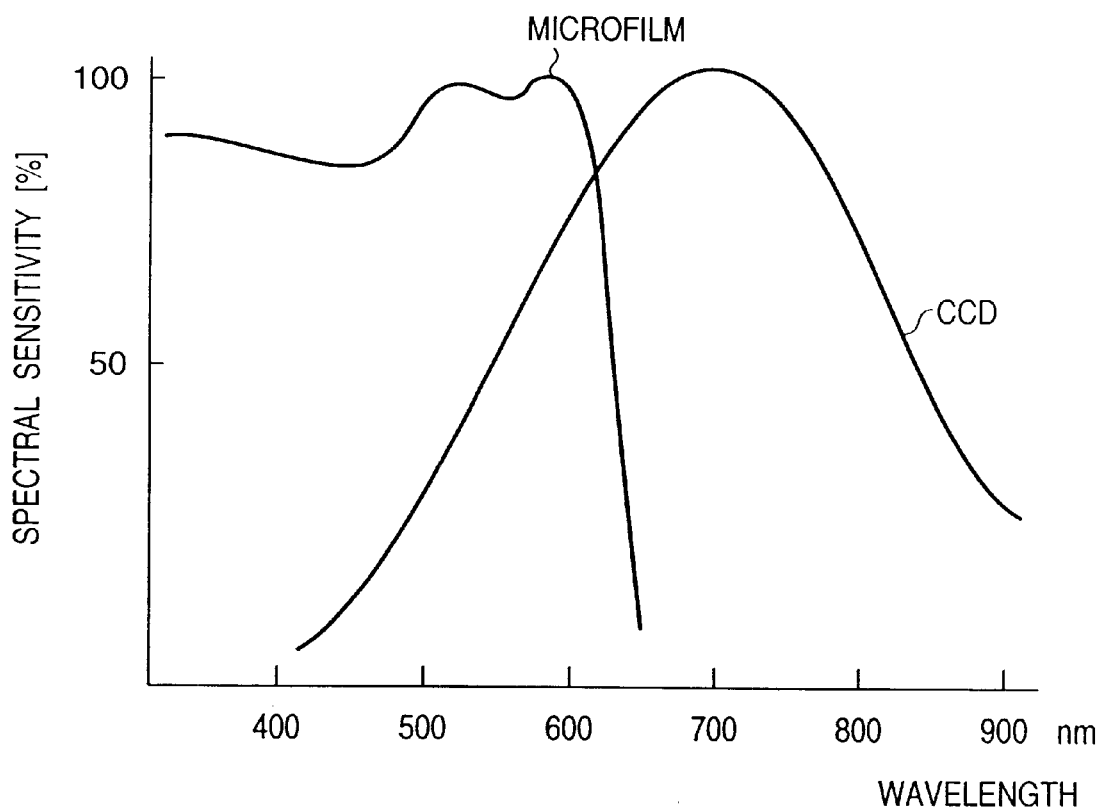
FIG. 3 is a graph showing the spectral sensitivity characteristics of a light-receiving element that performs photoelectric conversion, and a photosensitive material.

The document, images of which have been read by the read sensors 108A and 108B, is conveyed to the MF guide glass windows by the convey rollers 105 while being held by the convey guide plates 106A and 106B. The conveyed document 101 is illuminated by the cold cathode tube type illumination lamps 112A and 112B. As can be seen from FIG. 3, since the read sensors 108A and 108B, and the microfilm 119 have different sensitivity characteristics, the lamps 112A and 112B can provide light source light suitable for the microfilm 119.

An image on the illuminated document 101 is guided to the variable slit 114 via the first mirrors 113A and 113B, and is adjusted by the variable slit 114 to a predetermined light amount. The adjusted image then exposes the microfilm 119 via the second, third, and fourth mirrors 115, 116, and 117. FIG. 4 schematically depicts the light amount varying operation by the variable slit 114.

After the microfilm 119 is exposed, the document is exhausted via an exhaust port (not shown) by the convey rollers 105 while being held by the convey guide plates 106A and 106B.

The series of operations are done at each speed corresponding to the read resolution of the light-receiving elements.

Since the light source used upon reading an image, and that used upon exposing the microfilm are independently arranged, the light sources can be set in correspondence with their photosensitive characteristics. Hence, the read image is free from any deterioration (e.g., blurred text, fog, or the like) due to a filter or the like. Since the light source corresponding to the sensitivity characteristics of the microfilm can be used upon photographing using the microfilm, a higher-quality image with high contrast can be obtained. Further, a stable reading of an image is accomplished by changing and setting the light source according to a color document.

Since the illumination units are independently arranged, more appropriate, flexible setups can be made in correspondence with the document convey speed.

As described above, according to the first embodiment, since the apparatus comprises the first image illumination unit for illuminating the document to be read by the image reading unit, and the second image illumination unit for illuminating the document to be recorded by the photographing unit, the light sources can be set in correspondence with the photosensitive characteristics of the image reading unit and photographing unit, respectively.

More specifically, the read image is free from any deterioration (e.g., blurred text, fog, or the like) due to a filter or the like. Upon photographing using a photosensitive material, since the light source corresponding to the sensitivity characteristics of the photosensitive material can be used, higher-quality image with high contrast can be obtained. Since the illumination units are independently arranged, more appropriate, flexible setups can be made in correspondence with the document convey speed.

(Second Embodiment)

The second embodiment of an image reading apparatus according to the present invention will be described below with reference to the accompanying drawings. Note that the shapes of building components, their relative layout, and the like described in this embodiment do not limit the scope of the present invention to themselves unless otherwise specified. Also, numerical values are presented for the reference purpose, and do not limit the scope of the present invention to themselves.

Figure 8:
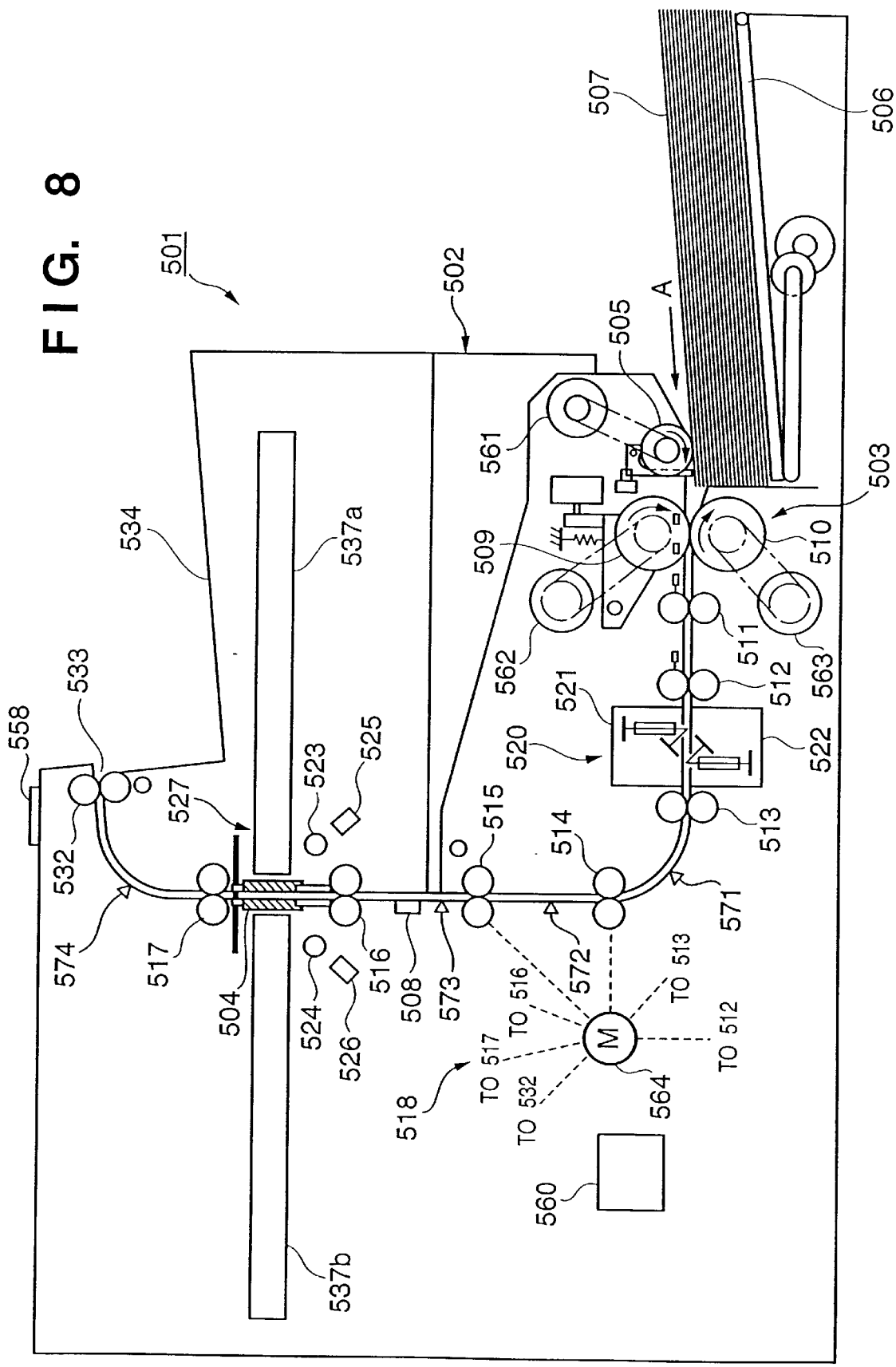
FIG. 8 is a schematic front sectional view of an image reading apparatus according to the second embodiment of the present invention.

FIGS. 8 to 12 show an image reading apparatus of the second embodiment. FIG. 8 is a schematic front sectional view of an image reading apparatus 501. The image reading apparatus 501 comprises a document feed unit 503, image reading unit 520, document conveying unit 518, microfilm photographing unit (photographing unit) 527, control circuit (control unit) 560 for controlling the overall image reading apparatus 501, console panel (resolution selector, density setter, obverse/reverse selector) 558, and the like.

In the document feed unit 503, when a document 507 is placed on a paper feed tray 506 of a main body 502 of the image reading apparatus 501, the paper feed tray 506 moves upward to urge the document 507 against a pickup roller 505 under the control of the control circuit 560. The document 507 then moves in the direction of an arrow A upon rotation of the pickup roller 505. The document 507 is separated and conveyed one by one by a feed roller 509 and separation roller 510, which rotate in the directions of arrows in FIG. 8, and is fed into the apparatus main body 502. The pickup roller 505, feed roller 509, and separation roller 510 are respectively rotated by motors 561, 562, and 563.

The document 507 that has been separated and fed is conveyed inside the apparatus main body 502 by pairs of rollers 511, 512, 513, 514, 515, 516, 517, and 532, which are rotated by a driving motor 564, and is exhausted onto an exhaust tray 534. Rotations of the motors 561, 562, 563, and 564 are controlled by the control circuit 560 to be able to change the convey speed of the document. The driving motor 564 and the pairs of rollers 511, 512, 513, 514, 515, 516, 517, and 532 constitute the document convey unit 518.

Image reading units 521 and 522 which form the image reading unit 520 respectively include dedicated illumination light sources and photoelectric conversion elements, and convert document images into image information data in response to a control signal from the control circuit 560. The image reading units 521 and 522 are arranged along the convey path to respectively face the obverse and reverse sides of the document, and convert images on the two sides of the document into image information data by conveying the document only once.

The image resolution of the image reading units 521 and 522 is changed by changing the speed of the convey motor 564 which rotates under the control of the control circuit 560. The image resolution is selected and input by the user at the console panel 558.

A pair of opposed document guide glasses 504 are disposed on the document convey path. The document 507 which passes the document guide glasses 504 is illuminated by illumination lamp units 523 and 524 via these document guide glasses. At this time, light scattered by the document 507 is guided into an optical path and exposes a microfilm F (see FIG. 9), thus taking a photo.

In this manner, the document 507, the image information of which has been read and which has undergone microfilm photographing, is exhausted from an exit 533 onto the exhaust tray 534 via a pair of exit rollers 532.

Figure 9:
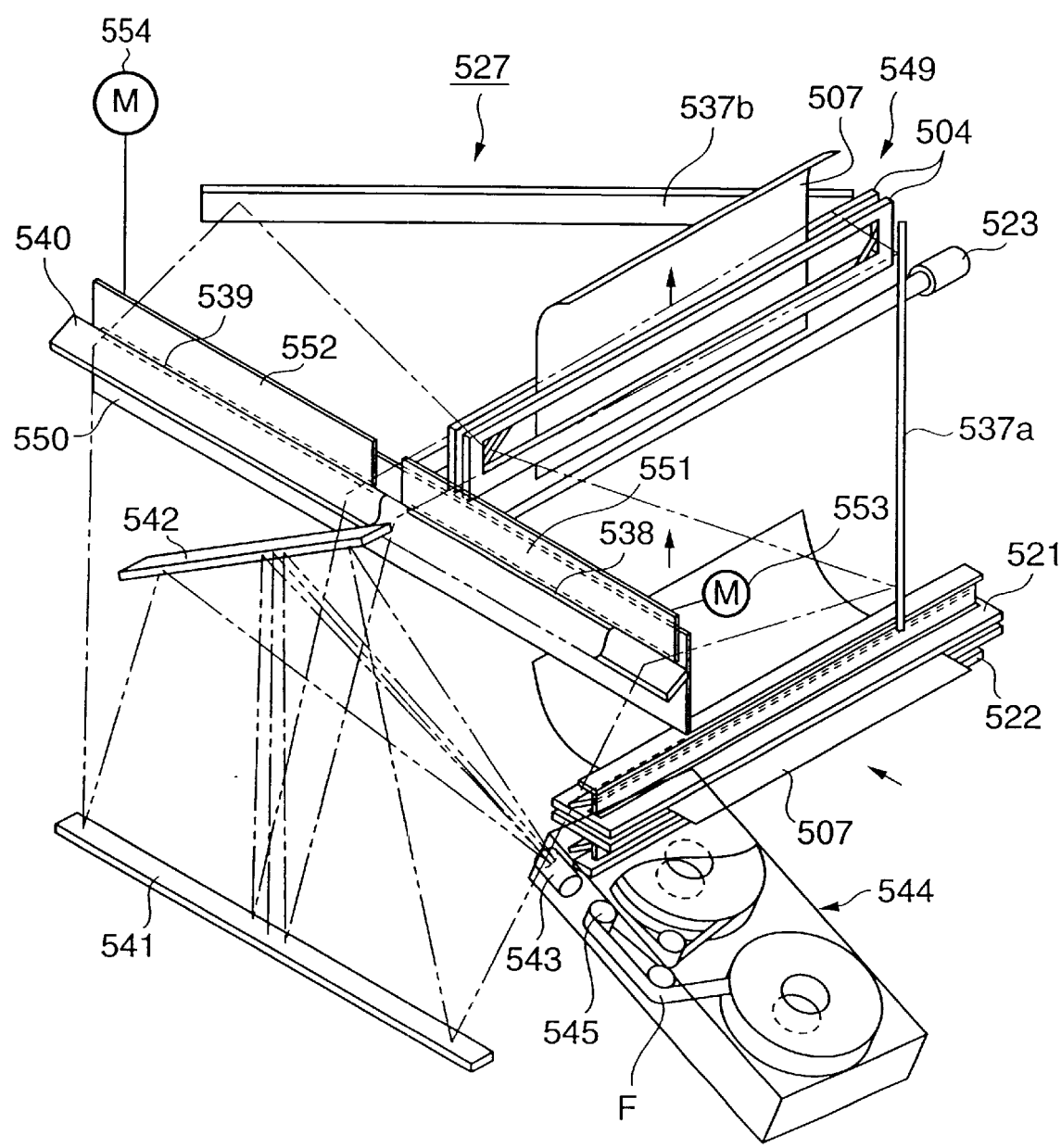
FIG. 9 is a schematic perspective view of a microfilm photographing unit in FIG. 8.

FIG. 9 is a perspective view showing one aspect of an optical system of the microfilm photographing unit 527 according to the present invention.

Light components scattered by the document 507, the obverse and reverse surfaces of which are illuminated by the illumination lamp units 523 and 524 within the region of the document guide glasses 504, are reflected by first mirrors 537a and 537b, pass through exposure adjustment slits (slits) 538 and 539, are reflected obliquely downward by a second mirror 540, and are then reflected upward by a third mirror 541. After that, the scattered light components are reflected forward by a fourth mirror 542, are transmitted through an imaging lens 543 of a microfilm camera 544, and form an image on a microfilm F as a recording medium on a capstan 545.

The capstan 545 is coupled to a driving system of the main body 502 of the image reading apparatus 501 via a capstan clutch (not shown). The capstan clutch is coupled in synchronism with the timing at which the document 507 reaches the photographing position. When the capstan clutch is coupled, the capstan 545 is rotated by the driving system to convey the microfilm F. The moving amount and remaining amount of the microfilm F are detected by an encoder as a detector (not shown), which is coupled to the capstan 545.

The microfilm camera 544 is detachably attached to the main body 502 of the image reading apparatus 501. The microfilm camera 544 has the imaging lens 543 corresponding to the photographing magnification of the microfilm, the capstan 545, and a reduction gear for driving the capstan 545 at a reduction gear ratio corresponding to the document convey speed of the main body 502 of the image reading apparatus 501.

In FIG. 8, lamp light amount sensors 525 and 526 detect variations of amounts of light emitted by the illumination lamp units 523 and 524.

Figure 10:
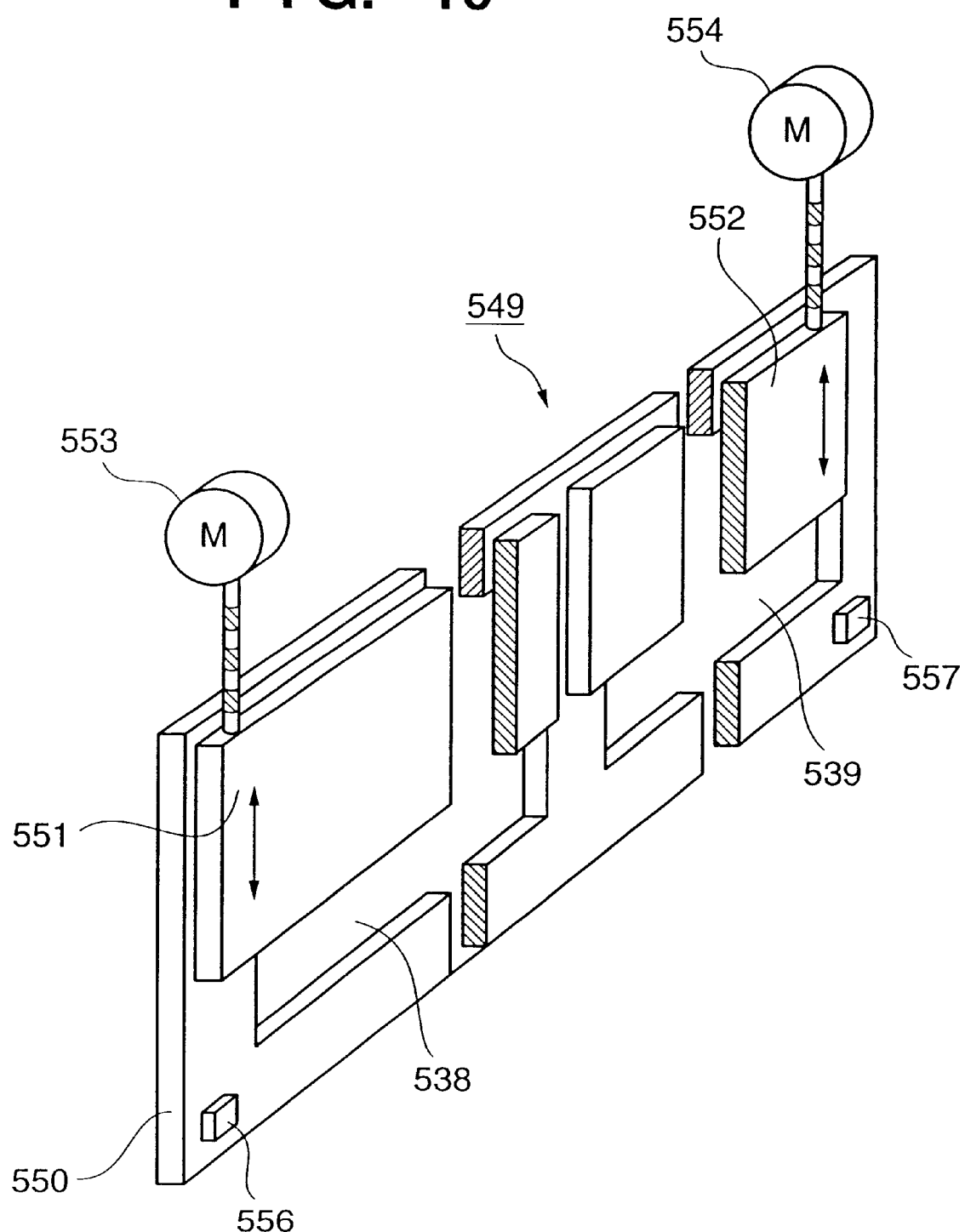
FIG. 10 is a perspective view of an exposure value adjustment slit mechanism in FIG. 9.

FIG. 10 is a perspective view of the exposure adjustment slit mechanism (exposure adjustment unit) 549 in the microfilm photographing unit 527. Cutaway portions in FIG. 10 indicate omissions in the longitudinal direction. The exposure adjustment slit mechanism 549 comprises a stationary frame 550, slit plates (adjustment members) 551 and 552, slit driving motors 553 and 554, home position sensors 556 and 557, and the like. The slit plates 551 and 552 are respectively connected to the slit driving motors 553 and 554. The open/close amounts of exposure adjustment slits 538 and 539 are adjusted by driving the slit driving motors 553 and 554. The slit driving motors 553 and 554 use pulse motors or the like since they control the moving amounts of the slit plates 551 and 552, although their types are not particularly limited.

The slit plates 551 and 552 which change the widths of the exposure adjustment slits 538 and 539 upon driving of the slit driving motors 553 and 554 move in the same direction as the document convey direction when the exposure adjustment slits 538 and 539 are opened.

The home position sensors 556 and 557 detect if the slit plates 551 and 552 are located at home positions as their downward positions. The home position sensors 556 and 557 output home position signals when the exposure adjustment slits 538 and 539 are completely closed. With this arrangement, upon detecting the home positions of the slit plates 551 and 552, the exposure adjustment slits 538 and 539 need not be opened, thus preventing the microfilm F from being irradiated with extra light.

The operation of the exposure adjustment slit mechanism 549 will be explained below.

When the document 507 has passed a document sensor 508 disposed upstream the document guide glasses 504 in FIG. 8, the control circuit 560 calculates the widths of the exposure adjustment slits 538 and 539 that give appropriate exposure to the microfilm F on the basis of the document convey speed, and controls driving of the obverse and reverse slit driving motors 553 and 554, thus opening the exposure adjustment slits 538 and 539.

The opening/closing timings of the exposure adjustment slits 538 and 539 by the slit plates 551 and 552 change depending on the document speed and open/close amounts, and the movement end timing of the slit plates 551 and 552 to appropriate slit widths preferably matches the arrival timing of the leading end of the document to the document guide glasses 504. That is, when the document convey speed is high, and the open/close amounts of the exposure adjustment slits 538 and 539 are large, the slit plates 551 and 552 must move upward relatively early after the document 507 has passed the document sensor 508. On the other hand, when the document convey speed is low and the open/close amounts of the slits are small, the slit plates 551 and 552 must move upward a given time after the document has passed the document sensor.

In this way, when the document convey speed is low, the slit plates begin to operate at the same timing as that for high document convey speed after the document has passed the document sensor 508, thus preventing wasteful exposure.

In the open/close amount control of the exposure adjustment slits 538 and 539, since the open/close amounts are finely adjusted in correspondence with light amount signals from the lamp light amount sensors 525 and 526, a light amount change circuit of a lamp control circuit, which is required in the conventional apparatus, can be removed, and microfilm exposure can be adjusted by a simple circuit arrangement.

In a duplex mode in which the two surfaces of the document are simultaneously photographed, the open/close amounts of the exposure adjustment slits 538 and 539 are finely adjusted in accordance with the light amounts of the obverse and reverse illumination lamp units 523 and 524.

The illumination lamp units 523 and 524 are turned on at an earlier timing than the open/close start timing of the exposure adjustment slits 538 and 539.

After the light amounts of the illumination lamp units 523 and 524 become stable, the slit plates 551 and 552 can move to the slit widths, which are calculated on the basis of the detected light amounts of the illumination lamp units 523 and 524, the document convey speed, and the density input by the user at the control panel 558, at a timing before the leading end of the document reaches the document guide glasses 504.

For this reason, when the illumination lamp units 523 and 524 require a certain time until their light amounts become stable, they may be turned on before a document is fed from the paper feed tray 506.

When the leading end of the document has reached the document guide glasses 504 after the exposure adjustment slits 538 and 539 are opened/closed by an appropriate amount, the capstan 545 that conveys the microfilm F is coupled to the driving system (not shown) provided to the main body 502 via the clutch (not shown) and conveys the microfilm F at a speed corresponding to the document convey speed and photographing magnification. In this way, the document image is photographed on the microfilm F.

When the trailing end of the document has passed the document guide glasses 504, the control circuit 560 drives the obverse and reverse slit driving motors 553 and 554 in the reverse direction until the slit plates 551 and 552 are detected by the home position sensors 556 and 557, thus closing the exposure adjustment slits 538 and 539. After the exposure adjustment slits 538 and 539 are completely closed, clutch connection (not shown) is released, and conveyance of the microfilm F is stopped, thus ending photographing.

In the above operations, when the read resolution of the image reading unit 520 is changed, the slit widths of the microfilm photographing unit also change to adjust the exposure value of the microfilm. At this time, when the image is read at a high resolution, the document convey speed becomes low, and the widths of the exposure adjustment slits 538 and 539 decrease. In slit exposure of the microfilm, a microfilm photographed image has higher resolution with decreasing widths of the exposure adjustment slits 538 and 539. Conversely, when the image reading unit 520 reads an image at a low resolution, the document convey speed becomes high, the slit widths become large, and the photographing resolution of the microfilm also becomes low. Therefore, since the resolution of the microfilm photographed image increases in correspondence with the operation for increasing the image read resolution, operations can be standardized, and the read image information and microfilm image as a backup can have correlation.

According to the image reading apparatus 501 of the present invention, even when a simple lamp control circuit is used, microfilm photographing can be simultaneously made without sacrificing the performance of the image reading unit 520. In addition, neither an expensive photoelectric conversion element nor image processing circuit are required, and an inexpensive apparatus can be provided.

Furthermore, the image reading apparatus 501 can take correlation between the read image information and the resolution of the microfilm, which is effective upon searching and relating microfilm images using the read image information and vice versa.

Figure 11:
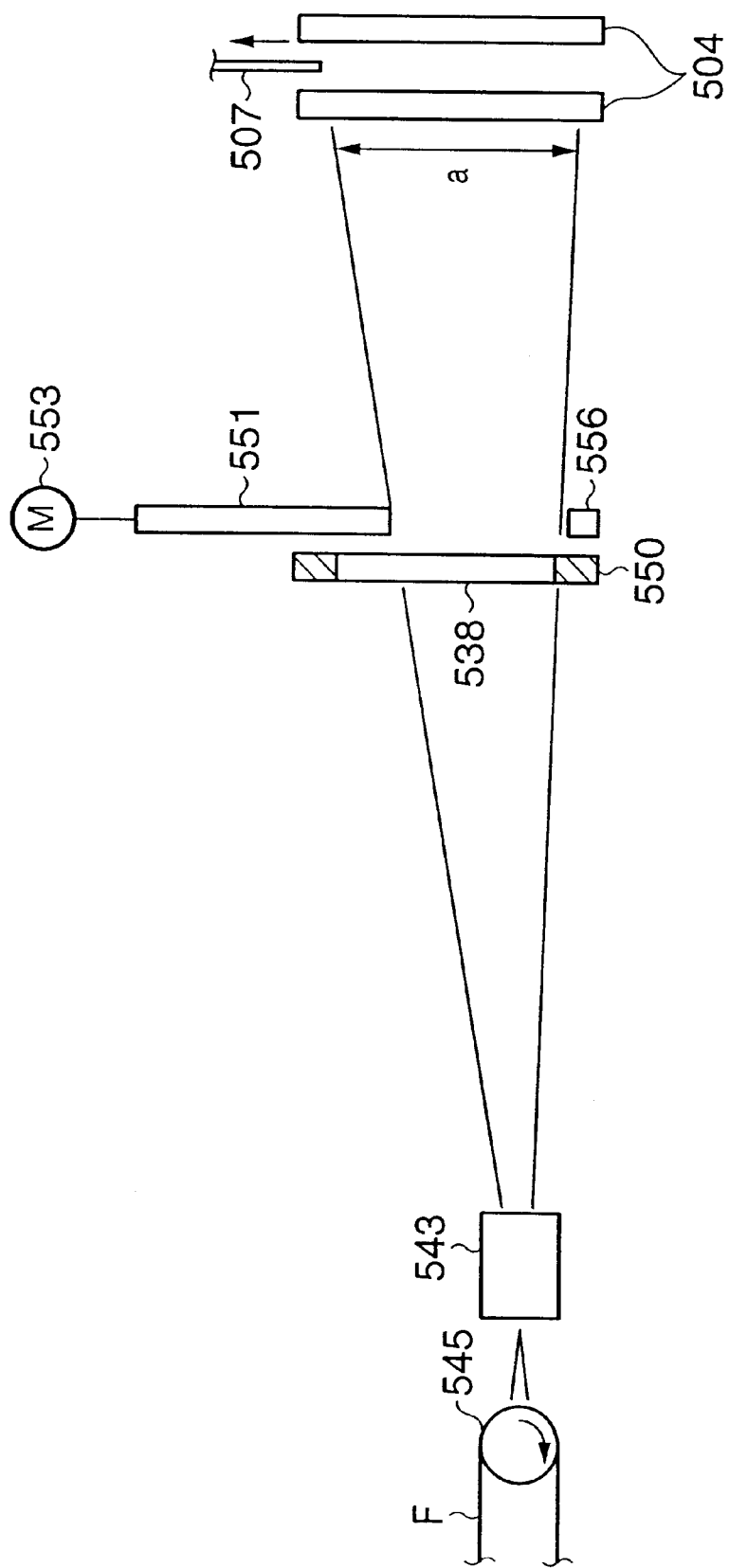
FIG. 11 shows an optical path for a high document convey speed.

FIG. 11 shows an optical path at a high document convey speed.

When the document convey speed is high, since the convey speed of the microfilm F is also high, exposure to the microfilm F must be increased. Therefore, the widths of the exposure adjustment slits 538 and 539 are set large. For this reason, an effective exposure region to the microfilm F has a width indicated by symbol a at the position of the document guide glasses 504.

If the exposure adjustment slits 538 and 539 are opened/closed while the document is located within the effective exposure region a at the position of the document guide glasses 504, density nonuniformity is generated on the microfilm F and, hence, the exposure adjustment slits 538 and 539 cannot be opened/closed. Therefore, the close start timing of the slits is set when the trailing end of the document has passed the effective exposure region a.

Figure 12:
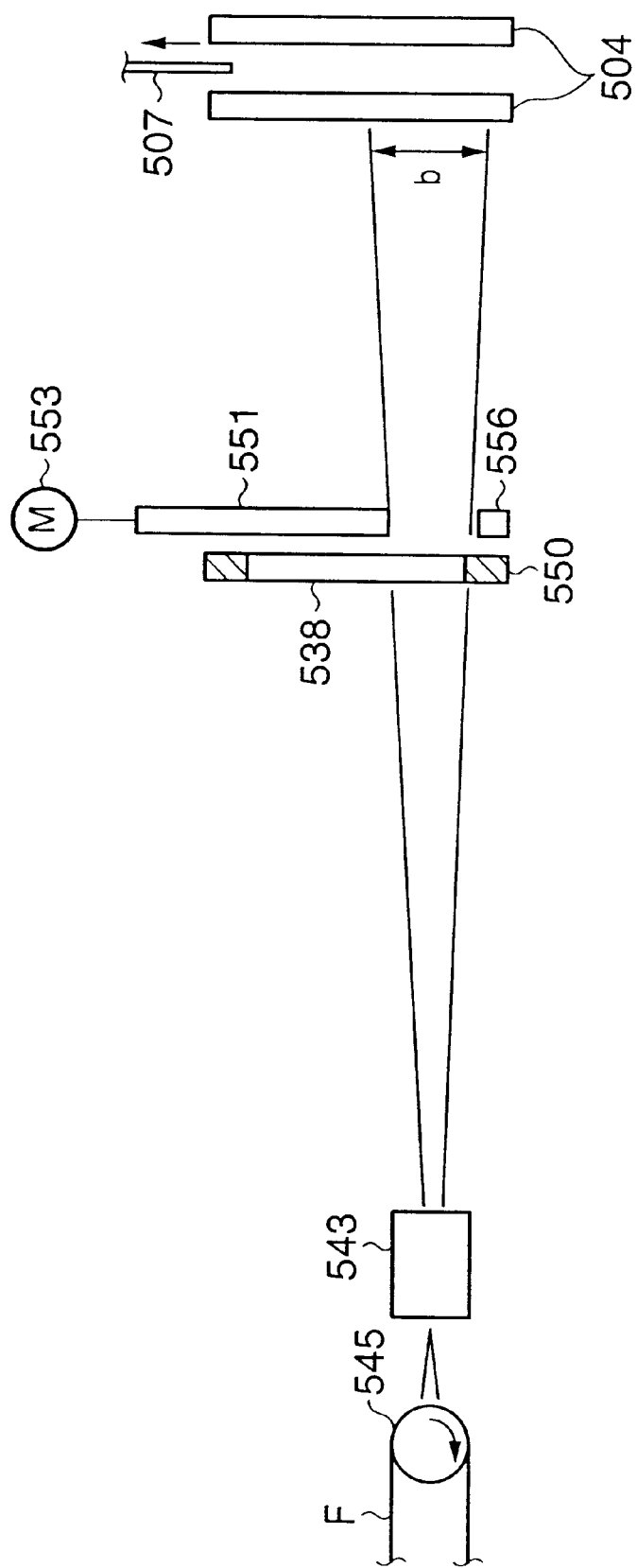
FIG. 12 shows an optical path for a low document convey speed.

FIG. 12 shows an optical path at a low document convey speed.

When the document convey speed is low, since the convey speed of the microfilm is also low, exposure to the microfilm must be decreased. Therefore, the widths of the exposure adjustment slits 538 and 539 are set small. For this reason, the effective exposure region to the microfilm F has a width indicated by symbol b at the position of the document guide glasses 504.

When the document convey speed is high, the effective exposure region near the document guide glasses 504 is smaller than that at a low document convey speed.

For example, when the effective exposure region has a width of 2 mm at 600 dpi, a high-speed convey state at 100 dpi requires a convey speed six times that at 600 dpi, and an effective exposure region of 12 mm is required. In this way, the effective exposure regions at 600 and 100 dpi have a difference of 10 mm on the conveyed document, and are greatly effective upon photographing and saving a small check, certificate, and the like.

By changing the close timings of the exposure adjustment slits 538 and 539 and the convey stop timing of the microfilm in correspondence with a change in trailing end of the effective exposure region depending on the document convey speed, film consumption per image of the microfilm can be reduced.

In the duplex mode in which the two surfaces of the document are simultaneously photographed, since the widths of the exposure adjustment slits 538 and 539 are finely adjusted in correspondence with the amounts of light of the obverse and reverse illumination lamp units 523 and 524, the obverse and reverse effective exposure regions have different widths. At this time, the widths of the exposure adjustment slits 538 and 539 are compared, and the convey stop timing of the microfilm is changed to the close timing of the exposure adjustment slit with the larger width.

According to this embodiment, the frame spacing on the microfilm can be minimized. However, when the document skews upon conveying, an image loss occurs.

By contrast, when a skew of the document is detected upon reading an image by the image reading units 521 and 522 before microfilm photographing, the control is switched to broaden the frame spacing on the microfilm without closing the exposure adjustment slits 538 and 539 and stopping conveyance of the microfilm irrespective of the document convey speed until the document is conveyed a sufficiently large distance after it has passed the effective exposure region. In this way, even when the document skews, an image loss on the microfilm can be prevented.

Upon photographing only one surface of the microfilm (to be also referred to as a simplex mode), the control circuit 560 maintains the illumination lamp unit 523 (or 524) on the non-photographing side OFF, and also the exposure adjustment slit on the non-photographing side closed. The user can select on the control panel 558 one or both the surfaces (obverse and reverse surfaces) of the document, which to be read and photographed.

In this manner, since the illumination lamp unit 523 (or 524) on the non-photographing side is not turned on if no slit plate which is required in the microfilm photographing unit 527 having the simplex photographing mode is inserted, halation due to light rays from the non-photographing side, fog due to the illumination lamp on the photographing side, which is transmitted through the document, and the like can be prevented. One cause of fog is photographing using backlight.

When operation errors such as jam and the like have occurred in the apparatus, they are detected by sensors (abnormality detectors) 571, 572, 573, and 574, and the control circuit 560 forcibly closes the exposure adjustment slits 538 and 539 and turns off the illumination lamp units 523 and 524 irrespective of the presence/absence of a document.

Furthermore, when an abnormality has occurred, entrance of external light rays into the microfilm photographing optical path upon removing a document that is stuck in the document convey portion by the user can be prevented.

(Third Embodiment)

Figure 13:
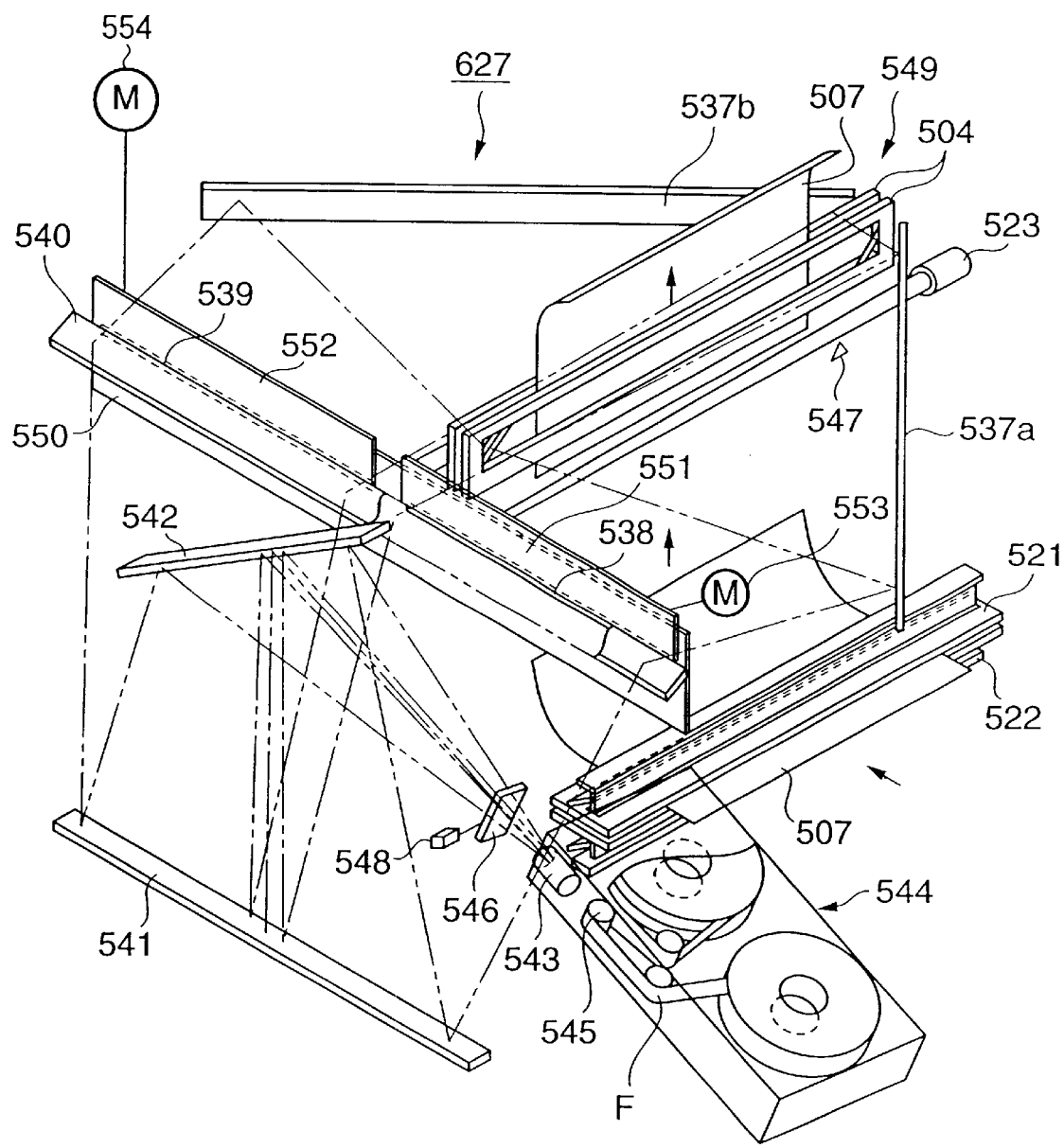
FIG. 13 is a schematic perspective view of a microfilm photographing unit of the third embodiment.

A microfilm photographing unit 627 which operates when the document convey spacing is small or when the slit driving motors 553 and 554 operate at low speed will be explained below with reference to FIG. 13. The same reference numerals denote the same parts as in the second embodiment, and a description of the structure and operations of those parts will be omitted.

When the document spacing is small or when the slit driving motors 553 and 554 operate at low speed, it becomes impossible to completely control to open/close the exposure adjustment slits 538 and 539 at the document spacing, as described in the second embodiment.

For this reason, the illumination lamp units 523 and 524 are turned on simultaneously with the beginning of document conveyance, and the slit driving motors 553 and 554 are then controlled in accordance with the outputs from lamp light amount sensors (sensors corresponding to reference numerals 525 and 526 in FIG. 8) and the document convey speed, thus adjusting the exposure adjustment slits 538 and 539 to predetermined widths.

When a document sensor 547 arranged upstream the document guide glasses 504 detects the document after the exposure adjustment slits 538 and 539 are adjusted, the control circuit releases a shutter (light-shielding portion) 546 inserted before the lens 543 by actuating a plunger (light-shielding portion) 548 at the same timing as that when the leading end of the document reaches the document guide glasses 504, and starts conveyance of the microfilm F at the same time. Note that the plunger 548 may work based on the document convey speed without using any sensor.

Then, when the trailing end of the document has passed the effective exposure region on the document guide glasses 504 calculated from the widths of the exposure adjustment slits 538 and 539, the control circuit closes the shutter 546, and stops the conveyance of the microfilm.

After the document has completely left the document guide glasses 504, the control circuit finely adjusts the exposure adjustment slits again on the basis of the outputs from the lamp light amount sensors.

The reason why the exposure adjustment slits 538 and 539 are not finely adjusted while the document is located at the position of the document guide glasses 504 is as follows. That is, since light coming from the illumination lamp units 523 and 524 is irregularly reflected by the document surface and the outputs from the lamp light amount sensors 525 and 526 fluctuate (especially, sensor outputs readily change depending on the document density), accurate lamp light amount outputs cannot be obtained.

Also, the reason why the widths of the exposure adjustment slits 538 and 539 are not controlled while the document is located at the position of the document guide glasses 504 is that when a change in image density due to a change in slit width per step of the slit driving motors 553 and 554 occurs within a single image, it appears as image nonuniformity. Furthermore, such image nonuniformity within a single image cannot be corrected and remains as nonuniformity on an output image when that image is printed out by a microfilm reader/printer (not shown) after photographing.

By contrast, when images have slight density differences, if each image undergoes automatic density correction of the reader/printer, such differences can be eliminated. By repeating the above operations during conveyance of the document, a change in light amount of the illumination lamp units 523 and 524 can be coped with.

After the entire effective photographing region of the document has passed, the exposure adjustment slits 538 and 539 are closed, the illumination lamp units 523 and 524 are turned off, and conveyance of the microfilm is stopped, thus ending all processes.

In this way, when the widths of the exposure adjustment slits 538 and 539 are changed between only documents, exposure to the microfilm can be appropriately adjusted in correspondence with variations of lamp light amounts, and the feed interval of documents can be shortened even when slow, inexpensive motors are used, thus improving the overall processing performance of the apparatus.

Therefore, since the image reading apparatus having the microfilm photographing unit 527 or 627 of the above embodiment changes the read resolution of the document scanner and the photographing resolution of the microfilm at the same time, the resolution of the document scanner can change in correspondence with the photographing resolution of the microfilm, and correlation between saved digital data and images photographed on the microfilm can be easily taken. Since the image reading apparatus of this embodiment changes the slit widths of the microfilm photographing unit in accordance with the document convey speed, the read resolution can be freely changed by adjusting exposure to the microfilm without changing the light amounts of the illumination lamp units. Hence, the document scanner can have a compact, inexpensive arrangement.

Furthermore, since the lamp light amount sensors are added, and the slit widths are changed in consideration of the lamp service life, a change in light amount of the lamps due to temperature, and the like, the need for a light amount varying circuit in the lamp light amount control circuit can be obviated. Hence, the apparatus arrangement can be simplified, and a cost reduction can be achieved.

In the conventional microfilm photographing apparatus, when only one surface of a document is to be photographed, a light-shielding shutter is provided to the non-photographing side to avoid abnormal exposure due to light which comes from the illumination lamp on the photographing side and is transmitted through, e.g., a thin document.

However, the arrangement of this embodiment can obtain the same effect by closing the exposure adjustment slit without any light-shielding shutter.

Furthermore, when the document convey speed is low, the photographing frame spacing on the microfilm can be reduced in consideration of the widths of the exposure adjustment slits, and a larger number of images can be photographed on a microfilm if its length remains the same.

When an abnormality has occurred in the apparatus during microfilm photographing, the slits are closed. In this way, even when the document convey path is opened upon removing a document that is stuck inside the apparatus, abnormal incoming light can be prevented from entering the microfilm photographing optical path without adding any new parts.

Since the image reading apparatus of the second and third embodiments can adjust exposure in correspondence with the document convey speed by controlling the degree of opening of each slit of the exposure adjustment unit even when the document read speed has changed, an image can be reliably read and photographed by a simple structure.

The present invention is not limited to the above embodiments and various changes and modifications can be made within the spirit and scope of the present invention. Therefore, to apprise the public of the scope of the present invention the following claims are made.

What is claimed is:

1. An image reading apparatus which comprises:

an image reading unit which reads image information of a document; and a photographing unit which records an image of the document on a photosensitive material by exposure, said apparatus further comprising:

a first image illumination unit which illuminates the document read by said image reading unit; and a second image illumination unit which illuminates the document recorded by said photographing unit, said second image illumination unit comprising a light amount varying mechanism for making light amount adjustment for photographing the document.

2. The apparatus according to claim 1, wherein said image reading unit comprises a light-receiving element for photoelectrically converting light reflected by the document, which is illuminated by said first image illumination unit, said first image illumination unit can be set as a light source according to photosensitive characteristics of said light-receiving element, and said second image illumination unit can be set as a light source according to photosensitive characteristics of the photosensitive material.

3. The apparatus according to claim 1, wherein said first and second image illumination units have different illumination light amounts.

4. The apparatus according to claim 1, wherein said first and second image illumination units use illumination light beams having different wavelengths.

5. The apparatus according to claim 1, wherein said first and second image illumination units can independently set light source light amounts.

6. The apparatus according to claim 1, wherein said first and second image illumination units can change a wavelengths of emitting lights.

7. The apparatus according to claim 1, wherein said first image illumination unit comprises a light amount varying mechanism for making light amount adjustment.

8. The apparatus according to claim 1, wherein said first and second image illumination units have different forms.

9. The apparatus according to claim 1, wherein said second image illumination unit comprises a cold cathode tube having a monochrome light source.

10. The apparatus according to claim 1, wherein said light amount varying mechanism makes light amount adjustment in accordance with a convey speed of the document recorded by said photographing unit.

11. The apparatus according to claim 1, wherein said light amount varying mechanism is a variable slit.

* * * * *